(12) United States Patent
Lin

(10) Patent No.: US 8,553,094 B2
(45) Date of Patent: Oct. 8, 2013

(54) INTERACTIVE IMAGE SYSTEM, INTERACTIVE APPARATUS AND OPERATING METHOD THEREOF

(75) Inventor: Cho Yi Lin, Hsin-Chu (TW)

(73) Assignee: Pixart Imaging Inc., Hsin-Chu County (TW)

( * ) Notice: Subject to any disclaimer, the term of this patent is extended or adjusted under 35 U.S.C. 154(b) by 799 days.

(21) Appl. No.: 12/041,892

(22) Filed: Mar. 4, 2008

(65) Prior Publication Data

US 2009/0052730 A1    Feb. 26, 2009

(30) Foreign Application Priority Data

Aug. 23, 2007    (TW) ................................ 96131177 A

(51) Int. Cl.
| | | |
|---|---|---|
| *H04N 5/228* | (2006.01) | |
| *H04N 5/225* | (2006.01) | |
| *G06F 3/033* | (2013.01) | |
| *G09G 5/08* | (2006.01) | |

(52) U.S. Cl.
USPC ........................ 348/208.14; 348/169; 345/158

(58) Field of Classification Search
USPC ...................................... 348/208.14, 169–172
See application file for complete search history.

(56) References Cited

U.S. PATENT DOCUMENTS

| | | | | |
|---|---|---|---|---|
| 6,292,218 B1 * | 9/2001 | Parulski et al. | ............ | 348/220.1 |
| 7,012,635 B2 * | 3/2006 | Umeda et al. | .............. | 348/208.4 |
| 2002/0149693 A1 * | 10/2002 | Tantalo et al. | ................. | 348/362 |
| 2005/0135682 A1 * | 6/2005 | Abrams et al. | ................. | 382/232 |
| 2005/0213662 A1 * | 9/2005 | Owens et al. | ............ | 375/240.16 |
| 2006/0007327 A1 * | 1/2006 | Nakamura et al. | ............ | 348/239 |
| 2006/0088102 A1 * | 4/2006 | Lee et al. | ................. | 375/240.16 |
| 2007/0183765 A1 * | 8/2007 | Imamura | ......................... | 396/55 |
| 2007/0233424 A1 * | 10/2007 | Ohta | ............................. | 702/154 |
| 2007/0263999 A1 * | 11/2007 | Keam | ............................ | 396/155 |

FOREIGN PATENT DOCUMENTS

| | | | |
|---|---|---|---|
| TW | I267754 | | 12/2006 |
| WO | WO 2007/036873 | * | 9/2006 |

* cited by examiner

*Primary Examiner* — Sinh Tran
*Assistant Examiner* — Christopher K Peterson
(74) *Attorney, Agent, or Firm* — Lowe Hauptman & Ham, LLP

(57) ABSTRACT

An interactive image system includes a host having a first wireless module and an access device for accessing software, at least one reference point for generating light of a predetermined spectrum and an interactive apparatus including a second wireless module, an image module, a modulation module and a processing unit. The image module captures images of the reference point with a sampling frequency to form a first image and a second image, calculates and outputs a moving vector of the images of the reference point between the first and second images. The processing unit controls the second wireless module to transmit the moving vector to the first wireless module and controls the modulation module to real-timely modulate the sampling frequency of the image module according to a predetermined condition. The present invention further provides an interactive apparatus and operating method thereof.

28 Claims, 9 Drawing Sheets

INTERACTIVE IMAGE SYSTEM, INTERACTIVE APPARATUS AND OPERATING METHOD THEREOF

CROSS REFERENCE TO RELATED APPLICATION

This application claims the priority benefit of Taiwan Patent Application Serial Number 096131177, filed on Aug. 23, 2007, the full disclosure of which is incorporated herein by reference.

BACKGROUND OF THE INVENTION

1. Field of the Invention

This invention generally relates to an interactive image system, interactive apparatus and operating method thereof, wherein the power consumption can be reduced by modulating the sampling frequency of an image module of the interactive apparatus.

2. Description of the Related Art

In a conventional game remote controller, e.g. a photographic pointer positioning device disclosed in Taiwan Patent Number I267754 which can be adapted in a light gun game, a control circuit which is respectively connected to a camera, a calculating unit and a communication interface is integrated in the photographic pointer positioning device. The communication interface is coupled to a host. An optical filter is disposed in front of the camera, and several emitting components for being photographed by the camera are integrated on the screen. When a user uses the photographic pointer positioning device to operate a program executed by the host, the camera photographs the screen and since the camera has the optical filter to block the light with a band outside the spectrum of the light emitted by the emitting components, only the emitting components will appear on the images captured by the camera. Then the images will be processed by the calculating unit to obtain a coordinate of the aiming point of the camera which will then be transmitted to the host such that the host can use this coordinate to perform corresponding control.

However in practical use, the remote controller is wirelessly coupled to the host for data communication so as to increase the operational convenience, and a battery module is used to provide the total needed electricity of the remote controller. Because the remote controller has a plurality of power consuming components, it is necessary to decrease the consuming power of each component as low as possible so as to prolong the lifetime of the battery module. Normally, the camera preferably captures images with a high sampling frequency so as to increase an accuracy of the coordinate of the aiming point calculated by the calculating unit. However, high image sampling frequency will accordingly increase the calculating load of the calculating unit and the total power consumption of the remote controller, and therefore the lifetime of the battery module will be shortened.

According to the above reason, it is necessary to further improve the aforementioned operating method of the remote controller so as to decrease the total power consumption of the remote controller and prolong the lifetime of the battery module.

SUMMARY OF THE INVENTION

It is an object of the present invention to provide an interactive image system, an interactive apparatus and an operating method thereof, wherein the power consumption of an interactive apparatus can be reduced by real-timely modulating the sampling frequency of the image module in the interactive apparatus.

In order to obtain the above object, the present invention provides an interactive image system which includes a host, at least one reference point and an interactive apparatus. The host includes a first wireless module and an access device for accessing software. The reference point generates light of a predetermined spectrum, for example, but not limited to, infrared light or ultraviolet. The interactive apparatus includes a second wireless module, an image module, a modulation module and a processing unit. The second wireless module is for data communication with the first wireless module. The image module captures images of the reference point with a sampling frequency to form a first image and a second image, calculates and outputs a moving vector of the images of the reference point between the first and the second images. The modulation module modulates the sampling frequency of the image module. The processing unit is coupled to the image module, controls the second wireless module to transmit the moving vector to the first wireless module and controls the modulation module to real-timely modulate the sampling frequency of the image module according to a predetermined condition.

According to another aspect of the present invention, the present invention further provides an interactive apparatus adapted to an interactive image system which includes the interactive apparatus, a host wirelessly coupled to the interactive apparatus and at least one reference point for generating light of a predetermined spectrum. The interactive apparatus includes a wireless module, an image module, a modulation module and a processing unit. The wireless module is for data communication with the host. The image module captures images of the reference point with a sampling frequency to form a first image and a second image, calculates and outputs a moving vector of the images of the reference point between the first and the second images. The modulation module modulates the sampling frequency of the image module. The processing unit is coupled to the image module, controls the wireless module to transmit the moving vector to the host and controls the modulation module to real-timely modulate the sampling frequency of the image module according to a predetermined condition.

The present invention further provides an operating method of an interactive apparatus which is adapted to an interactive image system including the interactive apparatus, a host wirelessly coupled to the interactive apparatus and at least one reference point for generating light of a predetermined spectrum. The operating method includes the steps of: providing an image module for capturing images of the reference point with a sampling frequency to form a first image and a second image, calculating and outputting a moving vector of the images of the reference point between the first and the second images; providing a wireless module for data communication with the host; and providing a processing unit for controlling the wireless module to transmit the moving vector to the host, and real-timely modulating the sampling frequency of the image module according to a predetermined condition.

The interactive image system and the interactive apparatus of the present invention further include a motion sensing module for sensing the status of the interactive apparatus and generating an electric signal, e.g. a potential difference signal or a current signal. The processing unit calculates an acceleration according to the electric signal and controls the wireless module to transmit the acceleration to the host.

In the above mentioned interactive image system, interactive apparatus and operating method thereof of the present invention, the predetermined condition includes: a frequency selection signal which is determined by the software accessed by the access device of the host sent from the host to the interactive apparatus, the moving vector of the images of the reference point between the first and the second images outputted by the image module of the interactive apparatus, and/or the acceleration of the interactive apparatus calculated by the processing unit according to the electric signal. The processing unit can control the modulation module to realtimely modulate the sampling frequency of the image module according to one or a combination of the above mentioned predetermined conditions so as to reduce the total power consumption of the interactive apparatus.

According to the interactive image system, interactive apparatus and operating method thereof of the present invention, preferably the sampling frequency is higher than 60 frames/second such that the image module can obtain the moving vector of the images of the reference point between the first and the second images. And the sampling frequency can, at most, reach 200 frames/second according to the limitation of hardware transmission speed.

According to the interactive image system and interactive apparatus of the present invention, the host may be a game machine or a computer system host; the software may be game software or computer software; the interactive apparatus may be a remote controller or a pointer pointing device.

BRIEF DESCRIPTION OF THE DRAWINGS

Other objects, advantages, and novel features of the present invention will become more apparent from the following detailed description when taken in conjunction with the accompanying drawings.

DETAILED DESCRIPTION OF THE PREFERRED EMBODIMENT

It should be noticed that, wherever possible, the same reference numbers will be used throughout the drawings to refer to the same or like parts.

Figure 1:
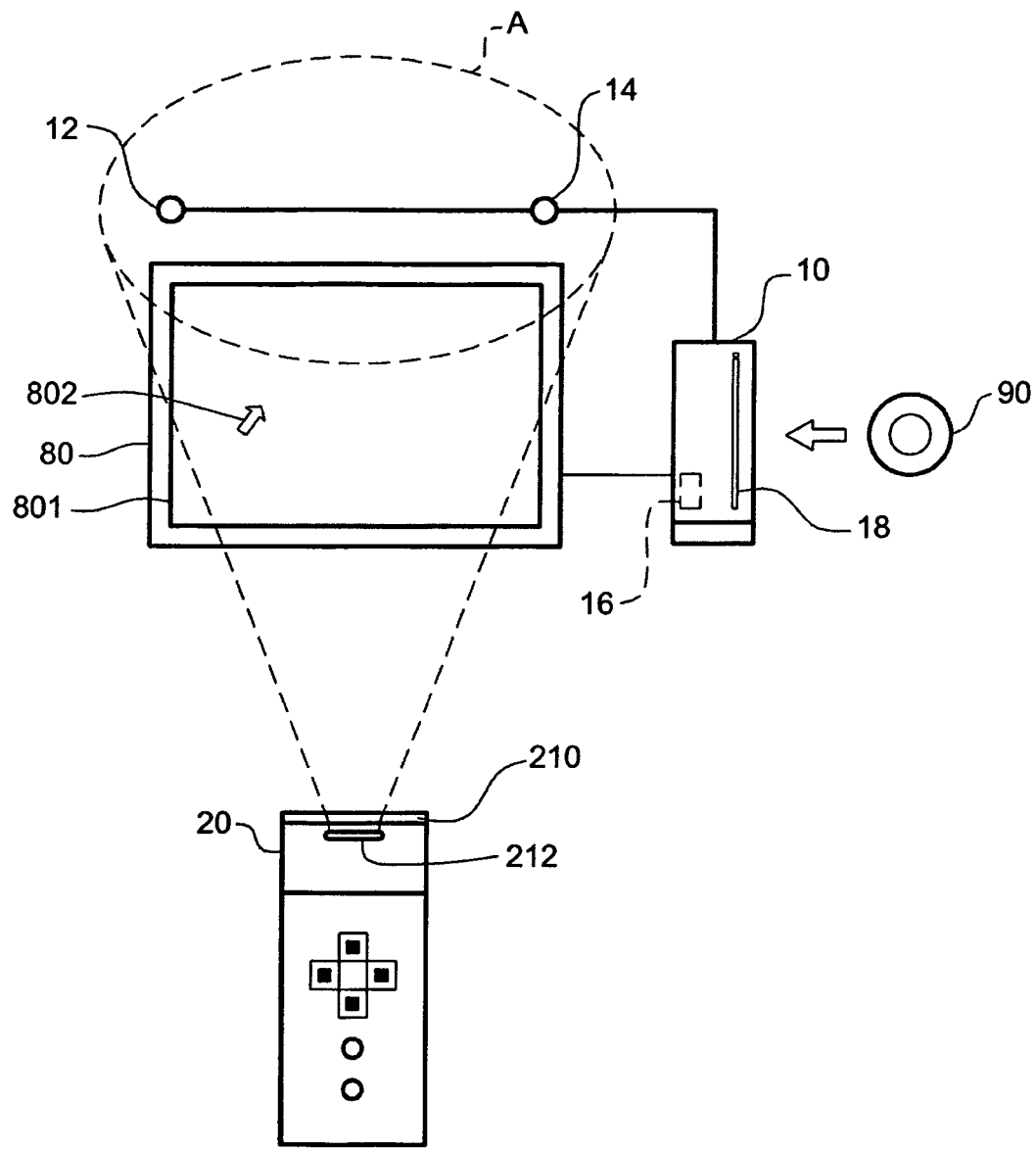
FIG. 1 shows a schematic view of an interactive image system according to one embodiment of the present invention.

Referring to FIG. 1, it schematically shows an interactive image system according to one embodiment of the present invention. The interactive image system includes a host 10, two reference points 12 and 14, an interactive apparatus 20 and an image display 80. Embodiments of the host 10 include, for example, a game machine and a computer system host. The host 10 includes a first wireless module 16 and an access device 18 which is for accessing software stored in, for example, a disc 90, a mobile disc or a memory device. The execution status of the software will be shown on the image display 80 for being operated by a user. A cursor 802, e.g. an aiming point of the light gun and a computer system's cursor, can be shown on the screen 801 of the image display 80. The reference points 12 and 14 can be any shape formed by arranging a plurality of light sources, for example LEDs (light emitting diode) and laser diodes of a specific wavelength, such as infrared light with wavelength peak at 940 nm or violet. The reference points 12 and 14 can be electrically connected to the image display 80 or the host 10, or they also may have an independent power source for providing electricity needed for emitting light. In addition, the interactive image system may contain one or a plurality of reference points rather than two. The interactive apparatus 20 captures images of the reference points 12, 14 and determines a relative position and/or angle variation between the interactive apparatus 20 and the reference points so as to accordingly control the activity of the cursor 802 on the screen 801. The interactive apparatus 20 is for controlling the software executed by the host 10, e.g. a game software or a computer software. When the software executed by the host 10 is a game software, the interactive apparatus 20 can be serves as, for example, but not limited to, a light gun, a billiard stick, a golf stick, a tennis racket, a baseball bat, a badminton racket and a ping-pong paddle etc., for controlling the game. When the software executed by the host 10 is a computer software, the interactive apparatus 20 may be served as a pointer (cursor) positioning device for controlling the operation of the computer software.

Figure 2:
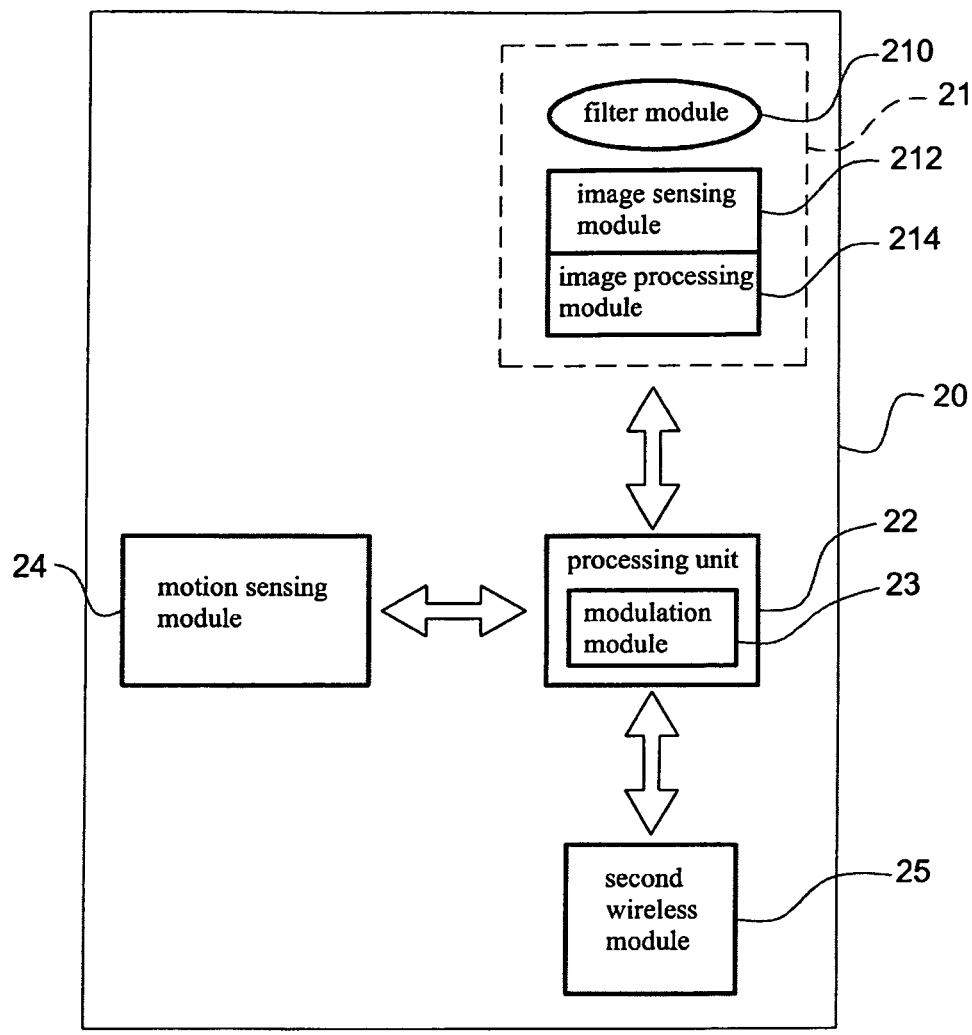
FIG. 2 shows a block diagram of an interactive apparatus according to one embodiment of the present invention.
Figure 3:
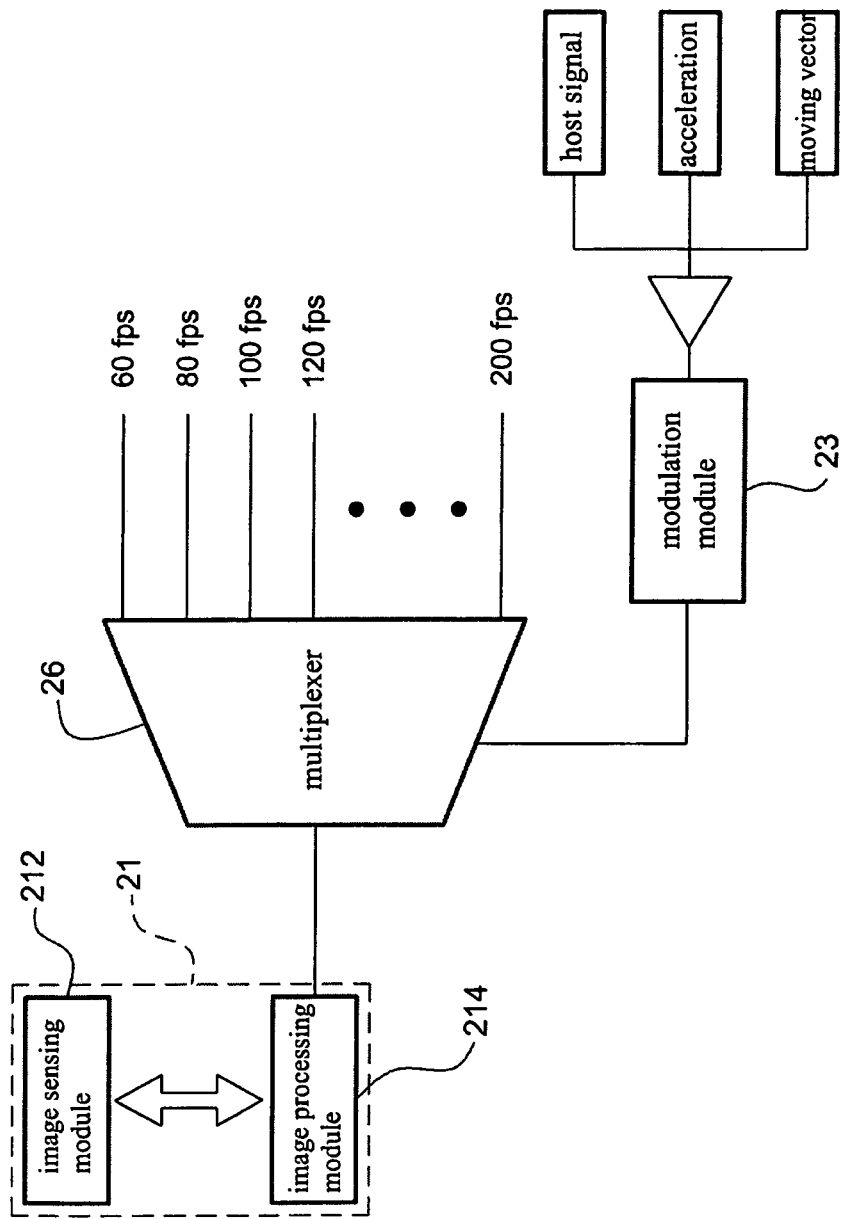
FIG. 3 shows schematically an operational diagram of the interactive apparatus according to the embodiment of the present invention.

Referring to FIGS. 1, 2 and 3, FIG. 2 shows a block diagram of an interactive apparatus 20 according to one embodiment of the present invention. The interactive apparatus 20 includes an image module 21, a processing unit 22, a modulation module 23, a motion sensing module 24 and a second wireless module 25. The image module 21 includes a filter module 210, an image sensing module 212 and an image processing module 214. The filter module 210 is for blocking light with a band outside the predetermined spectrum (infrared spectrum and violet spectrum) such that the image sensing nodule 212 receives light only from the reference points 12, 14 and interference from other light sources can be eliminated. The image sensing module 212 has a sensing array (not shown) which can sense the light from the reference points 12 and 14 with a sampling frequency, e.g. 60~200 frames/sec, so as to form digital images, and an image sensible area "A" (as shown FIG. 1) can be determined according to the viewing angle of the image sensing module 212 and emitting angles of the reference points 12 and 14. It can be understood that, FIG. 1 shows only an exemplary view of the image sensible area "A", and practically the image sensible area "A" could be wider than what is shown in FIG. 1. When the image sensing module 212 is pointed inside the image sensible area "A", since the image module 21 is integrated with the filter module 210, only the images of the reference points 12 and 14 are shown on the digital images. Embodiments of the image sensing module 212 include a charge coupled device (CCD) image sensor and a complementary metal-oxide semiconductor (CMOS) image sensor. The image processing module 214 calculates a moving vector of the images of the reference points 12 and 14 between the digital images according to a plurality of digital images sent from the image sensing module 212, and outputs the moving vector to the processing unit 22. It can be understood that, the digital images outputted from the image sensing module 212 also can be processed by the processing unit 22 so as to calculate the moving vector of the images of the reference points 12 and 14 between digital images.

Embodiments of the motion sensing module 24 include, but not limited to, an accelerometer and a gyro sensor. The motion sensing module 24 senses two-dimensional and/or three-dimensional acceleration variations of the interactive apparatus 20 and outputs a potential difference signal or a current signal. For example, when the interactive apparatus 20 is served as a baseball bat, the motion sensing module 24 can sense swinging statuses of a user (not shown) and generate an electric signal (the potential difference signal or the current signal). The processing unit 22 calculates an acceleration of the interactive apparatus 20 according to the electric signal and controls the second wireless module 25 to transmit the acceleration to the first wireless module 16 of the host 10 so as to accordingly control the operation of software.

The modulation module 23 modulates the sampling frequency of the image module 21 according to a predetermined condition. For example, in one embodiment, the modulation module 23 modulates the sampling frequency through a multiplexer 26, as shown in FIG. 3, and the sampling frequency is preferably higher that 60 frames/sec (200 frames/sec at most due to hardware transmission speed) such that the image module 21 can calculate the moving vector of the images of the reference points 12 and 14 between several digital images. It can be understood that, the modulation module 23 is not limited to be disposed inside the processing unit 22, and FIG. 2 only shows an exemplary embodiment. The predetermined condition to which the sampling frequency of the image module 21 is modulated according includes: (1) a frequency selection signal transmitted from the host 10 to the interactive apparatus 20 and the frequency selection signal can be automatically determined by the software accessed by the access device 18 of the host 10. For example, in dynamic games the sampling frequency can be set faster while in static games the sampling frequency can be set slower. The sampling frequency can also be set manually by a user; (2) the moving vector of the images of the reference points 12 and 14 between digital images obtained by the image module 21 of the interactive apparatus 20; and (3) the acceleration of the interactive apparatus 20 obtained by the processing unit 22. The processing unit 22 can control the modulation module 23 to real-timely modulate the sampling frequency of the image module 21 according to one or a combination of the above mentioned three predetermined conditions. In this manner, when high speed image capturing is not needed for the software executed by the host 10, it is able to decrease the sampling frequency of the image module 21 so as to decrease the total power consumption of the interactive apparatus 20.

Figure 4:
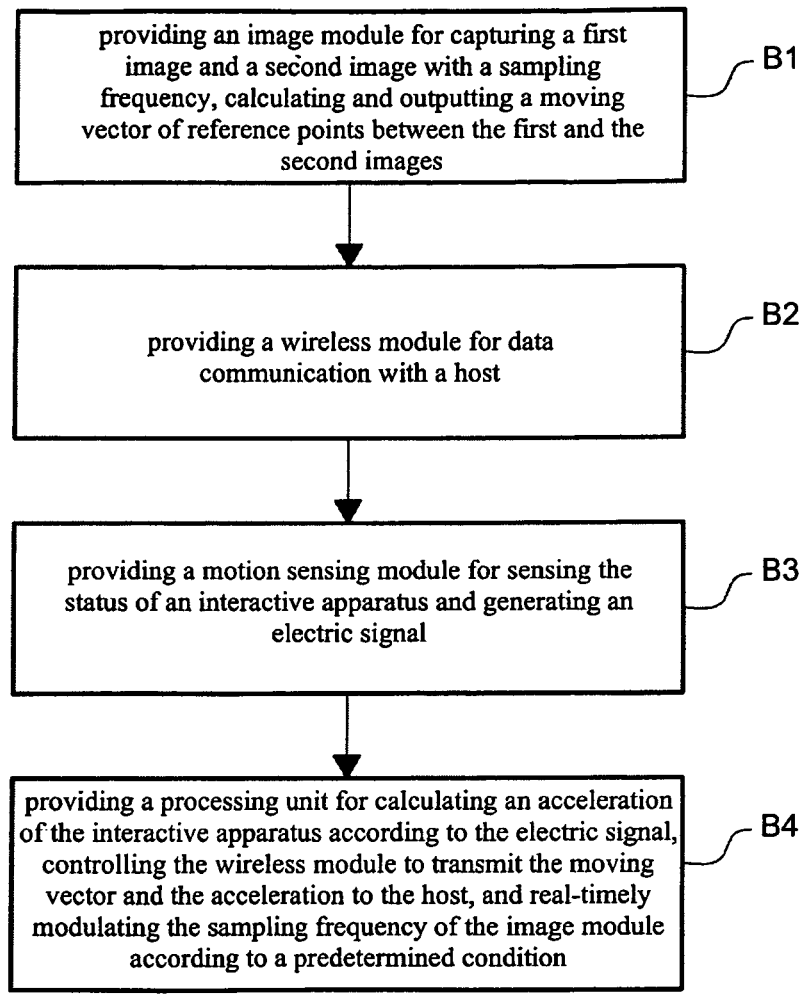
FIG. 4 shows a flow chart of an operating method of the interactive apparatus according to the embodiment of the present invention.

Referring to FIGS. 1 and 4, FIG. 4 shows a flow chart of an operating method of the interactive apparatus according to one embodiment of the present invention. The operating method includes the steps of: providing an image module for capturing images of the reference point with a sampling frequency to form a first image and a second image, calculating and outputting a moving vector of the images of the reference point between the first and the second images (step B1); providing a wireless module for data communication with the host (step B2); providing a motion sensing module for sensing the status of the interactive apparatus and generating an electric signal (step B3); providing a processing unit for calculating an acceleration of the interactive apparatus according to the electric signal, controlling the wireless module to transmit the moving vector and the acceleration to the host, and real-timely modulating the sampling frequency of the image module according to a predetermined condition (step B4). First, the image sensing module 212 of the image module 21 captures the light from the reference points 12 and 14 through the filter module 210 so as to form a plurality of digital images. The image processing module 214 calculates and outputs a moving vector of the images of the reference points 12 and 14 between the digital images according to the digital images and the calculation method will be illustrated with an example in the following paragraphs (step B1). Meanwhile, the motion sensing module 24 senses operation statuses of the interactive apparatus 20 operated by a user and generates an electric signal, e.g. a potential difference signal or a current signal (step B3). Next, the processing unit 22 calculates an acceleration of the interactive apparatus 20 according to the electric signal and controls the second wireless module 25 to transmit signals of the acceleration and the moving vector to the host 10 so as to accordingly control the host 10 (step B2). The processing unit 22 also controls the modulation module 23 to real-timely modulate the sampling frequency of the image module according to one or a combination of the above mentioned predetermined conditions (step B4).

In order to further explain the present invention, an example is given to illustrate a method by which the interactive apparatus 20 calculates the moving vector of the cursor 802 shown on the image display 80, but it is not used to limit the present invention.

Referring to FIGS. 5 to 8, in this embodiment, the interactive apparatus 20 is for controlling the movement of a cursor 802 shown on the screen 801 of the image display 80. The cursor 802 may be, for example, an aiming point of the light gun or a computer system's cursor for controlling software. The reference points 12 and 14 are represented with two identical shapes with different areas, e.g. the reference point 12 is denoted as a large star and its image shown on the digital image "DI" is $I_{12}$ while the reference point 14 is denoted as a small star and its image shown on the digital image "DI" is $I_{14}$. The control method of the cursor 802 includes the steps of: providing two reference points for generating light of a predetermined spectrum and defining a predetermined area (step 150); providing an image module for pointing inside the predetermined area (step 250); receiving the light of the predetermined spectrum with the image module and forming a digital image (step 300); determining positions and shapes of the images of the reference points on the digital image and generating a first parameter (step 400); performing distance and angle compensations on the first parameter (step 500); moving the pointing position of the image module inside the predetermined area and generating a second parameter (step 600); and calculating a moving distance of the images of the reference points between the digital images according to the compensated first parameter and the second parameter so as to accordingly control the movement of the cursor (step 700), wherein in step 700, the distance and angle compensations are simultaneously held on the second parameter (step 710) and a scale factor can be inputted so as to control the moving sensitivity of the cursor 802, and step 720 may be omitted.

Figure 5:
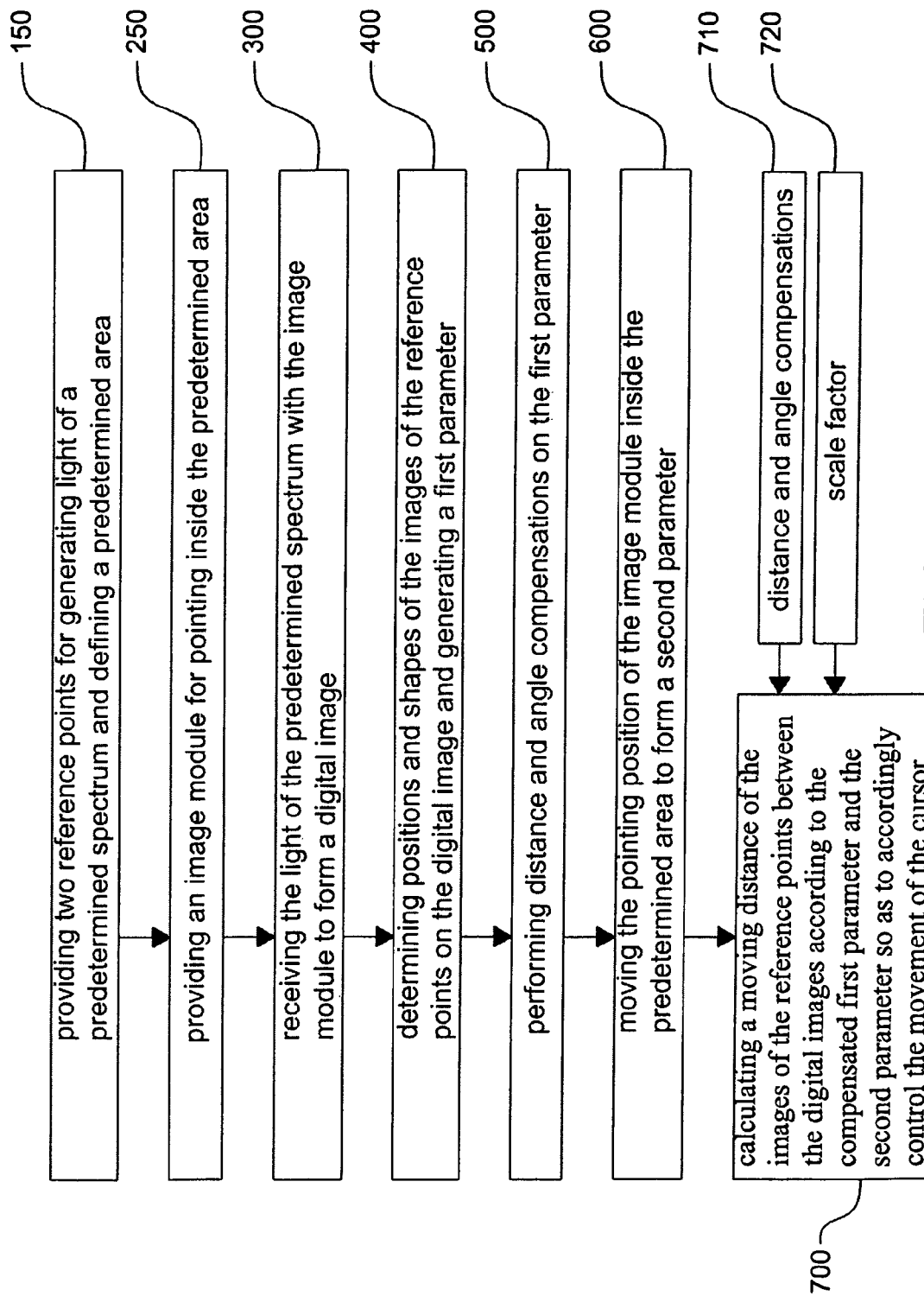
FIG. 5 shows a flow chart of a method for controlling a cursor shown on an image display by the interactive apparatus according to the embodiment of the present invention.
Figure 6A:
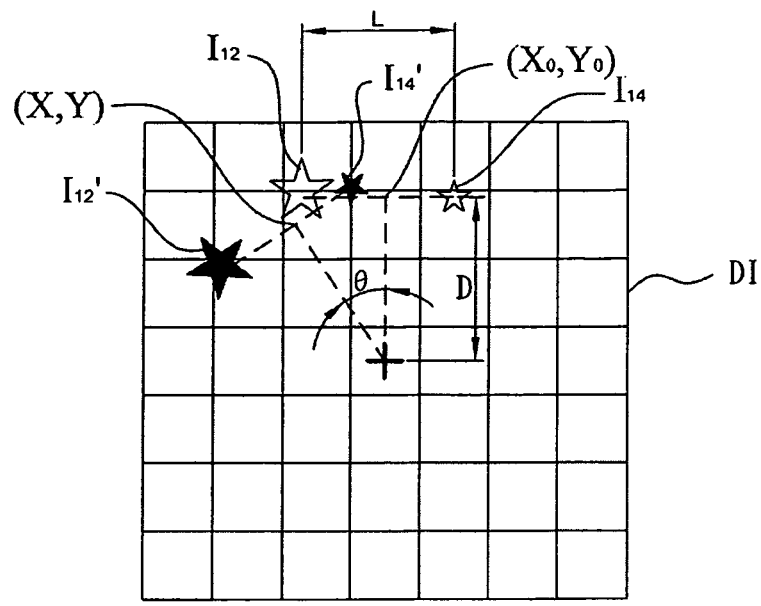
FIG. 6*a* shows a digital image captured by the interactive apparatus according to the embodiment of the present invention, wherein the interactive apparatus is rotated clockwise by an angle during photographing.

Referring to FIGS. 1, 5 and 6a, preferably before the interactive apparatus 20 leaves the factory, a predetermined image position parameter and a predetermined image distance parameter are preset in the image processing module 214. These parameters can be obtained according to predetermined images $I_{12}$ and $I_{14}$ of the reference points 12 and 14 captured by the image sensing module 212, as shown in FIG. 6a, when the interactive apparatus 20 is operated at a distance from the reference points 12 and 14, e.g. 3 meters, and be served as the basis for distance and angle compensations. For example, the predetermined image position and distance parameters can be defined according to a plane space formed by the sensing array of the image sensing module 212, e.g. a plane space having the center of the sensing array "+" as the original point. For example, the predetermined image position parameter may include coordinates of the predetermined images $I_{12}$ and $I_{14}$ of the reference points 12 and 14, their average coordinate $(X_0, Y_0)$ and a tilt angle of the connecting line of the predetermined images $I_{12}$ and $I_{14}$ in the plane space aforementioned. The predetermined image distance parameter may include a distance "L" between the predetermined images $I_{12}$ and $I_{14}$ of the reference points 12 and 14, and a distance "D" between an average coordinate $(X_0, Y_0)$ of the predetermined images $I_{12}$ and $I_{14}$ and the center of the sensing array "+" of the image sensing module 212.

First, the reference points generate light of a predetermined spectrum, e.g. infrared spectrum in the present embodiment, and therefore an image sensible area "A" surrounding the reference points 12 and 14 can be determined according to the viewing angle of the image sensing module 212 and the emitting angles of the reference points 12 and 14 (step 150). Next, use the image sensing module 212 of the interactive apparatus 20 to point at any place inside the image sensible area "A" (step 250). Since the image sensing module 212 of the present invention can only sense the light of the predetermined spectrum, only the images of the reference points 12 and 14 will appear on the digital image "DI" (step 300), as in FIG. 6a only the first images $I_{12}'$ and $I_{14}'$ are shown. Because the interactive apparatus 20 is rotated clockwise by an angle θ while capturing the digital images, a rotation angle θ exists between the first images $I_{12}'$ and $I_{14}'$ and the predetermined images $I_{12}$ and $I_{14}$ captured by the image sensing module 212 at aforementioned predetermined distance. In this manner, the average coordinate (X, Y) of the first images $I_{12}'$ and $I_{14}'$ does not coincide with the average coordinate $(X_0, Y_0)$ of the predetermined images $I_{12}$ and $I_{14}$ of the reference points although the image sensing module 212 is pointed at identical position.

Referring to FIGS. 1, 5, 6a and 6b, the image processing module 214 determines positions and shapes of the first images $I_{12}'$ and $I_{14}'$ of the reference points and generates a first parameter which includes a first image position parameter, a first image distance parameter and an image shape parameter (step 400). The image processing module 214 performs the angle compensation according to an angle deviation θ between the first image position parameter (including the average coordinate of the first images $I_{12}'$ and $I_{14}'$ and the tilt angle of their connecting line) and the predetermined image position parameter (including the average coordinate of the predetermined images $I_{12}$ and $I_{14}$ and the tilt angle of their connecting line) (step 500). The angle compensation is implemented according to equation (1), $$\begin{bmatrix} X' \\ Y' \end{bmatrix} = \begin{bmatrix} \cos(\theta) & -\sin(\theta) \\ \sin(\theta) & \cos(\theta) \end{bmatrix} \begin{bmatrix} X \\ Y \end{bmatrix} \quad (1)$$

where θ denotes an angle deviation between the first image position parameter and the predetermined image position parameter; X and Y denote the average coordinates in the first image position parameter before being compensated; X' and Y' (not shown) denote the average coordinates after being compensated. After the deviation angle is compensated, the images of the reference points 12 and 14 are compensated to images under the same basis. In this manner, the image sensing module 212 can obtain identical images under any rotating angles as long as aiming at the same point.

Figure 6B:
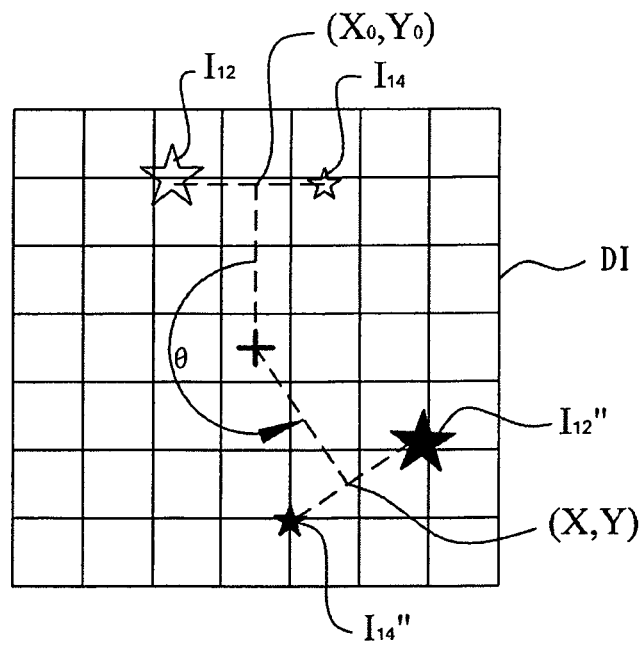
FIG. 6*b* shows a digital image captured by the interactive apparatus according to the embodiment of the present invention, wherein the interactive apparatus is rotated clockwise by an angle larger than 180 degrees during photographing.

However, if the deviation angle θ is larger than 180 degrees to form the images $I_{12}''$ and $I_{14}''$ as shown in FIG. 6b, and there is no difference between the reference points 12 and 14, i.e. having identical sizes and shapes, it is unable to distinguish that the images $I_{12}''$ and $I_{14}''$ are formed from rotating or moving the first images $I_{12}'$ and $I_{14}'$, as shown in FIG. 6a. Therefore in this embodiment, two reference points 12 and 14 with different sizes are utilized, and the position of each image of the reference points 12 and 14 are recognized first according to the image shape parameter, e.g. areas of the images of the reference points, obtained by the image processing module 214 and then perform the rotating angle compensation. In this manner, the angle compensation can be correctly performed even though the rotating angle of the image sensing module 212 during operation exceeds 180 degrees.

Figure 7:
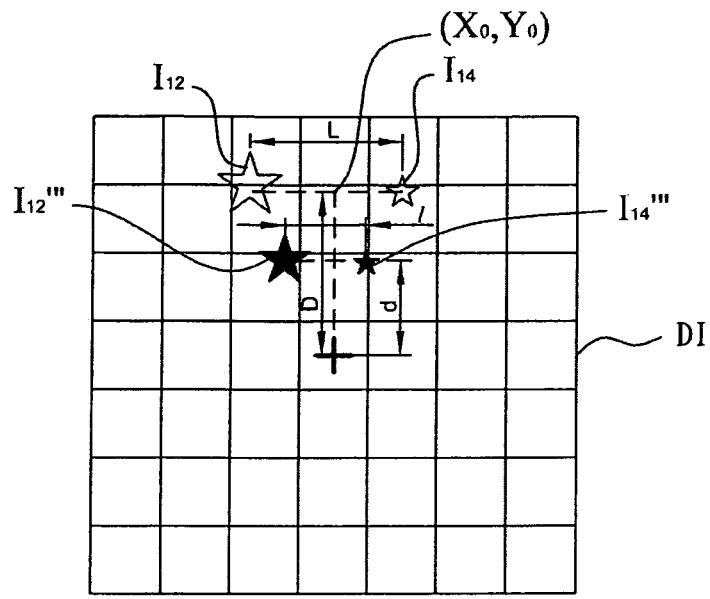
FIG. 7 shows digital images captured at different sensing distances by the interactive apparatus according to the embodiment of the present invention.

Referring to FIG. 7, it shows a method for distance compensation utilized in the embodiment of the present invention. The predetermined images $I_{12}$ and $I_{14}$ of the reference points 12 and 14 are captured by the image sensing module 212 of the interactive apparatus 20 while photographing at the predetermined distance. When the distance between the interactive apparatus 20 and the reference points 12 and 14 becomes larger, the captured images will become smaller and the average coordinate of the predetermined images $I_{12}$ and $I_{14}$ will become closer to the center "+" of the sensing array, shown as $I_{12}'''$ and $I_{14}'''$ in FIG. 7. However, the position deviation caused by this action does not represent that the user changes the aiming point of the interactive apparatus 20. If the position deviation is not corrected, the change of the photographing distance could be misrecognized as the movement of the aiming point of the interactive apparatus 20. In the illustration herein, it is assumed that a distance between two predetermined images $I_{12}$ and $I_{14}$ is "L" and a distance between the average coordinate $(X_0, Y_0)$ of the first images $I_{12}$ and $I_{14}$ of the reference points and the center "+" of the sensing array is "D" in the predetermined image distance parameter; a distance between two images $I_{12}'''$ and $I_{14}'''$ is "l" and a distance between the average coordinate of the images $I_{12}'''$ and $I_{14}'''$ of the reference points and the center "+" of the sensing array is "d" in the first image distance parameter. In this manner, the distance deviation can be compensated according to equation (2) (step 500):

$$\frac{D}{L} = \frac{d}{l} \quad (2)$$

Figure 8:
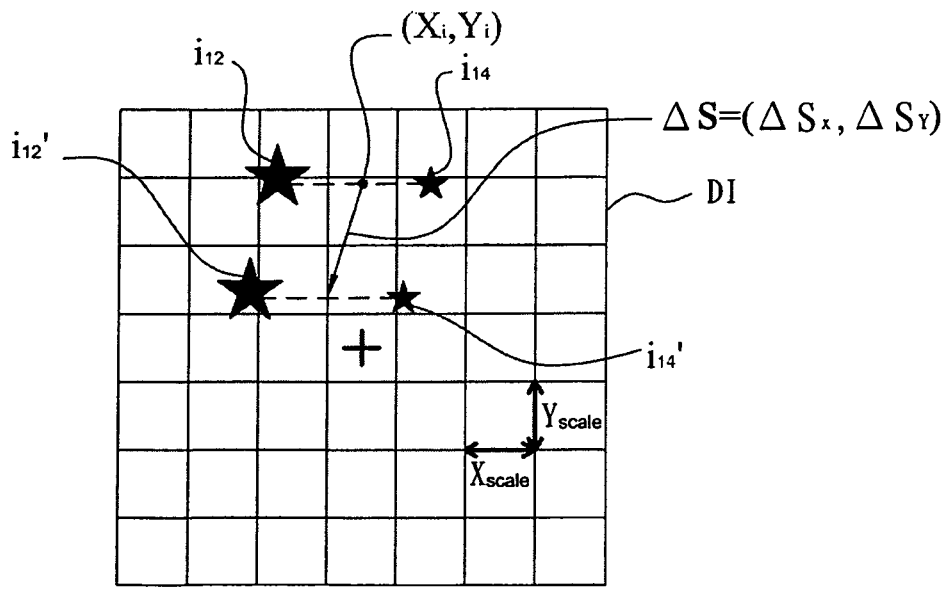
FIG. 8 shows digital images captured at different aiming points by the interactive apparatus according to the embodiment of the present invention.

Referring to FIG. 8, it is assumed that the images after being compensated are $i_{12}$ and $i_{14}$, which are images based on the same predetermined distance and rotating angle basis, and their average coordinate is $(X_t, Y_t)$. Then move the aiming point of the interactive apparatus 20 inside the image sensible range "A" so as to obtain a second image (step 600) including the images $i_{12}'$ and $i_{14}'$. The image sensing module 212 transmits the second image to the image processing module 214 which then generates a second parameter according to the second image including a second image position parameter and a second image distance parameter obtained from the images of the reference points 12 and 14 captured by the image sensing module 212 after moving its aiming point. The second image position parameter may include an average coordinate of the images of the reference points 12 and 14 according to a plane space formed by the sensing array of the image sensing module 212, e.g. a plane space having the center "+" of the sensing array as the original point; the second image distance parameter may include a distance between the images of the reference points 12 and 14 according to the same plane space. The image processing module 214 calculates a moving vector ΔS from the images $i_{12}$ and $i_{14}$ to the images $i_{12}'$ and $i_{14}'$ according to the compensated first image position parameter and the second image position parameter, and the second parameter is compensated by the aforementioned distance and angle compensations during calculation (step 710) so as to correctly control the moving of the cursor. Since the compensations on the second parameter are identical to that on the first parameter, the details will not be described herein. Then, the processing unit 22 controls the second wireless module 25 to wirelessly transmit the moving vector ΔS to the image display 80. Preferably, an application software is installed in the image display 80 for controlling its user interface and the cursor 802. After the image display 80 receives the signal of the moving vector from the second wireless module 25, it can accordingly control the cursor 802 to move on the screen 801 (step 700). In addition, during the calculation of the moving vector ΔS of the images $i_{12}$ and $i_{14}$, a set of scale factors $X_{scale}$ and $Y_{scale}$ can be inputted thereto (step 720) so as to control the moving sensitivity of the cursor 802 on the screen 801. For instance, the moving vector ΔS can be controlled according to equation (3), $$\Delta S = \left( \frac{\Delta S_X}{X_{scale}}, \frac{\Delta S_Y}{Y_{scale}} \right) \quad (3)$$

where $\Delta S_X$ denotes a parallel component of the moving vector and $\Delta S_Y$ denotes a vertical component of the moving vector. It could be seen from equation (3) that, when the values of $X_{scale}$ and $Y_{scale}$ become larger, the moving sensitivity of the cursor 802 become smaller, i.e. the moving distance of the aiming point of the interactive apparatus 20 has to be relatively large so as to obtain the same moving effect of the cursor 802 on the screen 801; on the contrary, when the values of $X_{scale}$ and $Y_{scale}$ become smaller, the moving sensitivity of the cursor 802 become larger, i.e. the moving distance of the aiming point of the interactive apparatus 20 need not to be so large to obtain the same moving effect of the cursor 802 on the screen 801. In this manner, the practicability of the interactive apparatus 20 can be increased.

Figure 9:
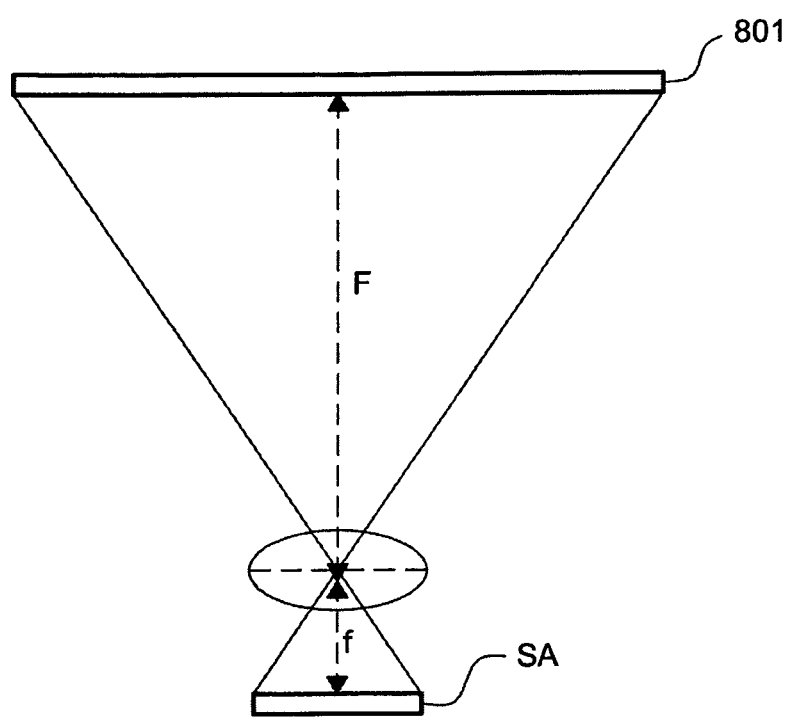
FIG. 9 shows schematically a proportional relation between an imaging distance of the image sensing module and a distance between the image sensing module and the screen in the interactive image system according to the embodiment of the present invention.
Figure 10:
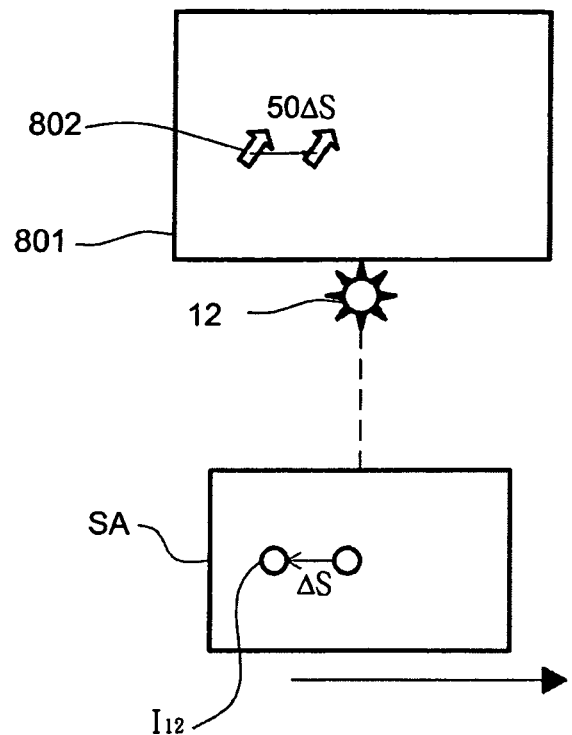
FIG. 10 shows schematically a relation between a position variation of a cursor on the screen of the image display and a position variation of the image of the reference point on the sensing array in the interactive image system according to the embodiment of the present invention.
Figure 11:
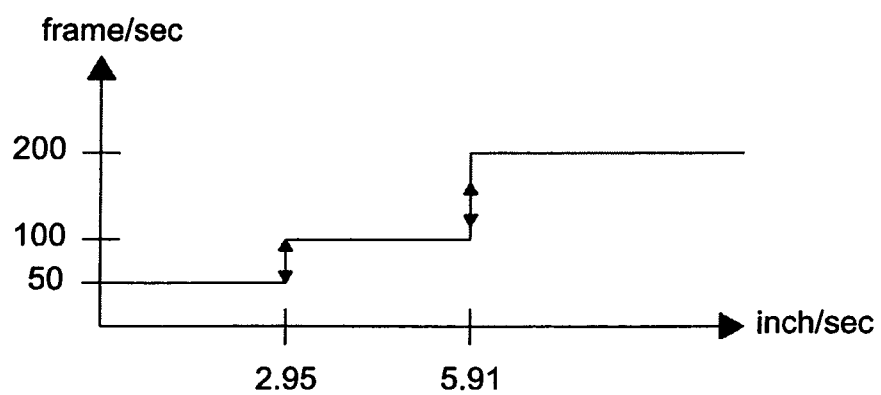
FIG. 11 shows schematically a relation diagram between the sampling frequency of the image module and the moving vector of the cursor in the interactive image system according to the embodiment of the present invention.

Referring to FIGS. 9 to 11, an exemplary embodiment is give for the illustration of a method that the processing unit 22 controls the modulation module 23 to modulate the sampling frequency of the image module 21 according to the moving vector obtained by the image processing module 214 of the interactive apparatus 20. FIG. 9 shows the proportional relation of the imaging distance "f" of the image sensing module 212 and the distance "F" between the image sensing module 212 and the screen 801. In one embodiment, the imaging distance f=32 mm and the distance between the image sensing module 212 and the screen 801 F=1.6 m, i.e. F/f=50. Referring to FIG. 10 together, it can be seen that a proportion of the moving distance of the cursor 802 on the screen 801 of the image display 80 and the moving distance of the image $I_{12}$ of the reference point on the sensing array "SA" of the image sensing module 212 is equal to 50, i.e. when the image processing module 214 obtains a moving vector of 1 micrometer, the cursor 802 will be moved by 50 micrometers on the screen 801 of the image display 80.

Then, an embodiment of setting the sampling threshold of the image module 21 will be illustrated. When the size of each pixel of the sensing array "SA" of the image sensing module 212 is 15 μm×15 μm, the sampling frequency is 200 frames/second and the moving vector of the reference point 12 between two frames is 2 pixels, it is able to obtain the position variation per second of the cursor 802 on the screen 801 of the image display 80 as $(15 \times 10^{-3}/25.4) \times 2 \times 50 \times 200 = 11.81$ inch/sec. In the same way, position variations per second within the sampling frequency 100 and 50 frames/second can be respectively obtained as 5.91 inch/sec and 2.95 inch/sec. Referring to FIG. 11, it shows a relation diagram between the sampling frequency of the image module 21 and the position variation of the cursor 802 on the screen 801 of the image display 80. In this embodiment, thresholds for changing the sampling frequency of the image module 21 are set as 2.95 inch/second and 5.91 inch/second, i.e. when the position variation of the cursor 802 on the screen 801 is lower than 2.95 inch/second, the modulation module 23 modulates the image module 21 to capture images with a sampling frequency of 50 frame/second; when the position variation of the cursor 802 on the screen 801 is lower than 5.91 inch/second and higher than 2.95 inch/second, the image module 21 will be controlled to capture images with a sampling frequency of 100 frame/second; when the position variation is higher than 5.91 inch/second, the image module 21 will be controlled to captures image with a sampling frequency of 200 frame/second.

It can be understood that, the proportional values, threshold values, number of the threshold values and values of the sampling frequency shown in FIGS. 9 to 11 are only exemplary embodiments, and they are not used to limit the present invention. The proportional values, threshold values, number of the threshold values and sampling frequency can be implemented according to actual requirements of different products. In addition, the method that the processing unit 32 controls the modulation module 23 to modulate the sampling frequency of the image module 21 according to the acceleration obtained by the motion sensing module 24 of the interactive apparatus 20 is to compare the electric signal outputted by the motion sensing module 24 with at least one or a plurality of threshold values, and then the processing unit 22 controls the modulation unit 23 to modulate the sampling frequency of the image module 21 according to the comparison results. In this manner, whet the position variation of the cursor 802 and/or the acceleration of the interactive apparatus 20 is low, the modulation module 23 modulates the image module 21 to capture images wither relatively lower sampling frequency such that the total consuming power of the interactive apparatus 20 can be reduced.

In addition, when a light source whose spectrum is totally or partially overlapped with the spectrum of the light generated by the reference points 12 and 14 exists in the neighboring of the interactive image system, e.g. a halogen lamp or a sun light source, the light generated by the reference points 12 and 14 can be modulated with a periodic or a non-periodic signal. In one embodiment, a modulation unit (not shown) can be integrated in the device which provides the electricity of the reference points 12 and 14, e.g. in the host 10 or the image display 80. The sampling frequency of the image module 21 preferably has a multiple relation with the modulation frequency of the modulation unit such that the image sampling and lighting of the reference points 12 and 14 can synchronize with each other. For example, in one embodiment, the sampling frequency of the image module 21 is 200 Hz (sampling once per 5 milliseconds) and the modulation frequency of the reference points is 20 Hz (lighting once per 50 milliseconds). In other words, when the image module 21 samples the tenth times, the reference points 12 and 14 are lighted such that the image module 21 can successfully capture the light of the predetermined spectrum generated by the reference points 12 and 14. Meanwhile, a demodulation device can be integrated in the interactive apparatus 20 so as to demodulate the modulated light signal such that interference from other light sources to image recognition can be eliminated.

As mentioned above, because the sampling frequency of the image sensor in the conventional remote controller is constant, the remote controller has high power consuming and its battery module needs to be changed frequently. According to the game system, apparatus for games and operating method thereof, the total power consumption of the interactive apparatus can be effectively reduced by real-timely modulating the sampling frequency of the image module disposed in the interactive apparatus so as to increase the practicability thereof.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. An interactive image system, comprising:
    a host comprising a first wireless module and an access device for accessing software;
    at least one reference point configured to generate light of a predetermined spectrum; and
    an interactive apparatus, comprising:
        a second wireless module for data communication with the first wireless module;
        an image module having a sensing array for capturing images of the reference point with a sampling frequency to form a first image and a second image, the image module further configured to calculate and output a position variation of images of the reference point in the first image and the second image;
        a modulation module for setting the sampling frequency of the image module; and
        a processing unit for controlling the second wireless module to transmit the position variation to the first wireless module, and for controlling the modulation module to set the sampling frequency of the image module according to movement per unit period of time of the images of the reference point with respect to the sensing array.

2. The interactive image system as claimed in claim 1, wherein the interactive apparatus further comprises a motion sensing module for sensing the status of the interactive apparatus and generating an electric signal, wherein the processing unit calculates an acceleration of the interactive apparatus according to the electric signal and controls the second wireless module to transmit the acceleration to the first wireless module.

3. The interactive image system as claimed in claim 2, wherein the motion sensing module is an accelerometer or a gyro sensor.

4. The interactive image system as claimed in claim 2, wherein the electric signal is a potential difference signal or a current signal.

5. The interactive image system as claimed in claim 1, wherein the reference point is an infrared LED and the predetermined spectrum is infrared spectrum.

6. The interactive image system as claimed in claim 5, wherein the image module further comprises:
    an infrared filter for blocking light with a band outside the predetermined spectrum;
    an image sensing module for capturing the images of the reference point with the sampling frequency to form the first and the second images; and
    an image processing module for calculating and outputting the position variation of the images of the reference point in the first and the second images.

7. The interactive image system as claimed in claim 6, wherein the image sensing module is a CCD image sensor or a CMOS image sensor.

8. The interactive image system as claimed in claim 1, wherein the sampling frequency of the image module is in a range between 60 frames/second and 200 frames/second.

9. The interactive image system as claimed in claim 1, wherein the reference point is electrically connected to the host.

10. The interactive image system as claimed in claim 1, further comprising an image display for displaying the software executed by the host.

11. The interactive image system as claimed in claim 10, wherein the reference point is electrically connected to the image display.

12. The interactive image system as claimed in claim 1, wherein the modulation module further comprises a multiplexer for altering the sampling frequency of the image module.

13. The interactive image system as claimed in claim 1, wherein the host is a game machine or a computer system host.

14. The interactive image system as claimed in claim 1, wherein the interactive apparatus is a remote controller or a pointer pointing device.

15. The interactive image system as claimed in claim 1, wherein the reference point is a LED or a laser diode.

16. An interactive apparatus adapted to an interactive image system which comprises the interactive apparatus, a host wirelessly coupled to the interactive apparatus and at least one reference point configured to generate light of a predetermined spectrum, the interactive apparatus comprising:
    a wireless module for data communication with the host;
    an image module having a sensing array for capturing images of the reference point with a sampling frequency to form a first image and a second image, calculating and outputting a position variation of the images of the reference point in the first and second images;

a modulation module for setting the sampling frequency of the image module; and a processing unit for controlling the wireless module to transmit the position variation to the host, and controlling the modulation module to set the sampling frequency of the image module according to movement per unit period of time of the images of the reference point with respect to the sensing array.

17. The interactive apparatus as claimed in claim 16, further comprising a motion sensing module for sensing the status of the interactive apparatus and generating an electric signal, wherein the processing unit calculates an acceleration of the interactive apparatus according to the electric signal and controls the wireless module to transmit the acceleration to the host.

18. The interactive apparatus as claimed in claim 17, wherein the motion sensing module is an accelerometer or a gyro sensor.

19. The interactive apparatus as claimed in claim 17, wherein the electric signal is a potential difference signal or a current signal.

20. The interactive apparatus as claimed in claim 16, wherein the predetermined spectrum is infrared spectrum and the image module further comprises:

a infrared filter for blocking light with a band outside the predetermined spectrum;

an image sensing module for capturing the images of the reference point with the sampling frequency to form the first and the second images; and an image processing module for calculating and outputting the position variation of the images of the reference point in the first and the second images.

21. The interactive apparatus as claimed in claim 20, wherein the image sensing module is a CCD image sensor or a CMOS image sensor.

22. The interactive apparatus as claimed in claim 16, wherein the sampling frequency of the image module is in a range between 60 frames/second and 200 frames/second.

23. The interactive apparatus as claimed in claim 16, wherein the modulation module further comprises a multiplexer for altering the sampling frequency of the image module.

24. The interactive apparatus as claimed in claim 16, which is a remote controller or a pointer pointing device.

25. An operating method of an interactive apparatus which is adapted to an interactive system comprising the interactive apparatus, a host wirelessly coupled to the interactive apparatus and at least one reference point configured to generate light of a predetermined spectrum, the operating method comprising the steps of:

capturing, by an image module having a sensing array, images of the reference point with a sampling frequency to form a first image and a second image;

calculating and outputting a position variation of the images of the reference point in the first and the second images; and setting, by a processing unit, the sampling frequency of the image module according to movement per unit period of time of the images of the reference point with respect to the sensing array.

26. The operating method as claimed in claim 25, further comprising:

sending, by a motion sensing module, status of the interactive apparatus and generating an electric signal according to the sensed status;

calculating an acceleration of the interactive apparatus according to the electric signal; and transmitting the acceleration to the host through the wireless module.

27. The operating method as claimed in claim 25, wherein the sampling frequency of the image module is in a range between 60 frames/second and 200 frames/second.

28. An interactive image system, comprising:

a host including a first wireless module and an access device for accessing software;

at least one reference point configured to generate light of a predetermined spectrum; and an interactive apparatus, including:

a second wireless module for data communication with the first wireless module;

an image module having a sensing array for capturing images of the reference point with a sampling frequency to form a first image and a second image;

a modulation module for setting the sampling frequency of the image module; and a processing unit for calculating a position variation of the images of the reference point in the first and the second images, controlling the second wireless module to transmit the position variation to the first wireless module, and controlling the modulation module to set the sampling frequency of the image module according to movement per unit period of time of the images of the reference point with respect to the sensing array.

* * * * *